April 26, 1938. E. RICHTER ET AL Re. 20,710

AUTOMATIC LEVELING MEANS FOR HEARSES AND OTHER VEHICLES

Original Filed Dec. 9, 1932 2 Sheets-Sheet 1

Inventors:
Edward Richter &
August Richter

By
Wilson, Dowell, McCanna & Wintercorn
Attys.

April 26, 1938. E. RICHTER ET AL Re. 20,710

AUTOMATIC LEVELING MEANS FOR HEARSES AND OTHER VEHICLES

Original Filed Dec. 9, 1932 2 Sheets-Sheet 2

Inventors:
Edward Richter &
August Richter

By
Wilson, Dowell, McCanna & Wintercorn
Attys.

Reissued Apr. 26, 1938

Re. 20,710

UNITED STATES PATENT OFFICE 20,710

AUTOMATIC LEVELING MEANS FOR HEARSES AND OTHER VEHICLES

Edward Richter and August Richter, Freeport, Ill.

Original No. 1,990,798, dated February 12, 1935, Serial No. 646,420, December 9, 1932. Application for reissue February 11, 1937, Serial No. 125,355

35 Claims. (Cl. 296—16)

Our invention relates to vehicle leveling means generally, and is particularly concerned with one suitable for use on hearses to insure proper disposition of the casket table in loading and unloading the casket.

The principal object of our invention is to provide leveling means of an automatic type in which the movement of a mercury pool to a central position controls the operation of the leveling means, and in which the mere act of opening the door of the hearse throws the leveling means into operation to level the hearse and the closing of the door thereafter permits the hearse to return to its normal position. In other words, we have aimed in our invention to secure entirely automatic operation.

Other objects and advantages of our invention will be brought out in the course of the following detailed description, in which reference is made to the accompanying drawings, wherein—

The same reference numerals are applied to corresponding parts throughout the views.

Figure 1:
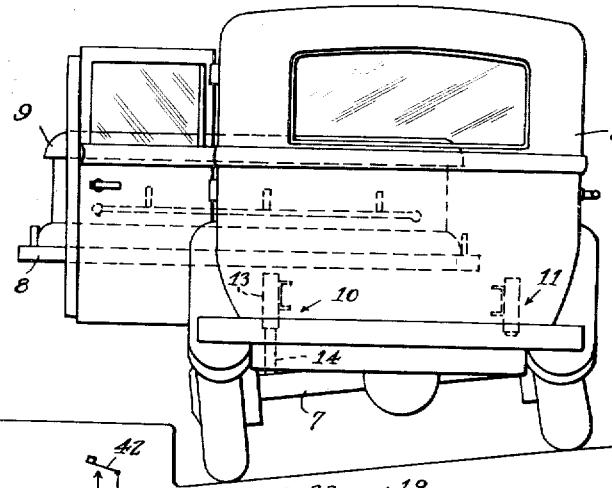
Figure 1 is a rear view of a side service hearse at a curb, illustrating how the body thereof is leveled in accordance with our invention.

Referring to Figure 1, we have illustrated a side service hearse standing at the curb on a street having the usual crown. There is such sidewise inclination of the hearse body due to the grading of the street from the crown to the curb that, unless the hearse is leveled, the side doors when opened and the casket table when extended from the side of the hearse come too close to the sidewalk and may even come in contact with it where the street has a high crown and a high curb. Our invention aims to avoid this objection by raising the hearse body, designated by the numeral 6, relative to the rear axle housing 7 on the curb side so as to make it level, and accordingly level the table 8 bearing the casket 9. A jack is indicated generally by the numeral 10 performing the function stated, and another jack is indicated generally by the numeral 11 on the other side of the hearse arranged to be used when the hearse is standing with that side next to the curb. It will be understood that while we have confined the disclosure to hearses, the invention is not to be regarded as limited to such an application but might be used on ambulances and any other vehicle where a similar problem making leveling necessary or desirable is presented. It should also be understood that while we refer to the use of jacks for cooperation only with the rear axle housing, other jacks could be provided for cooperation with the front axle, although we have found that there is actually no need for jacking up both ends, especially if the hearse body is of good rigid construction, which is usually the case.

Figure 2:
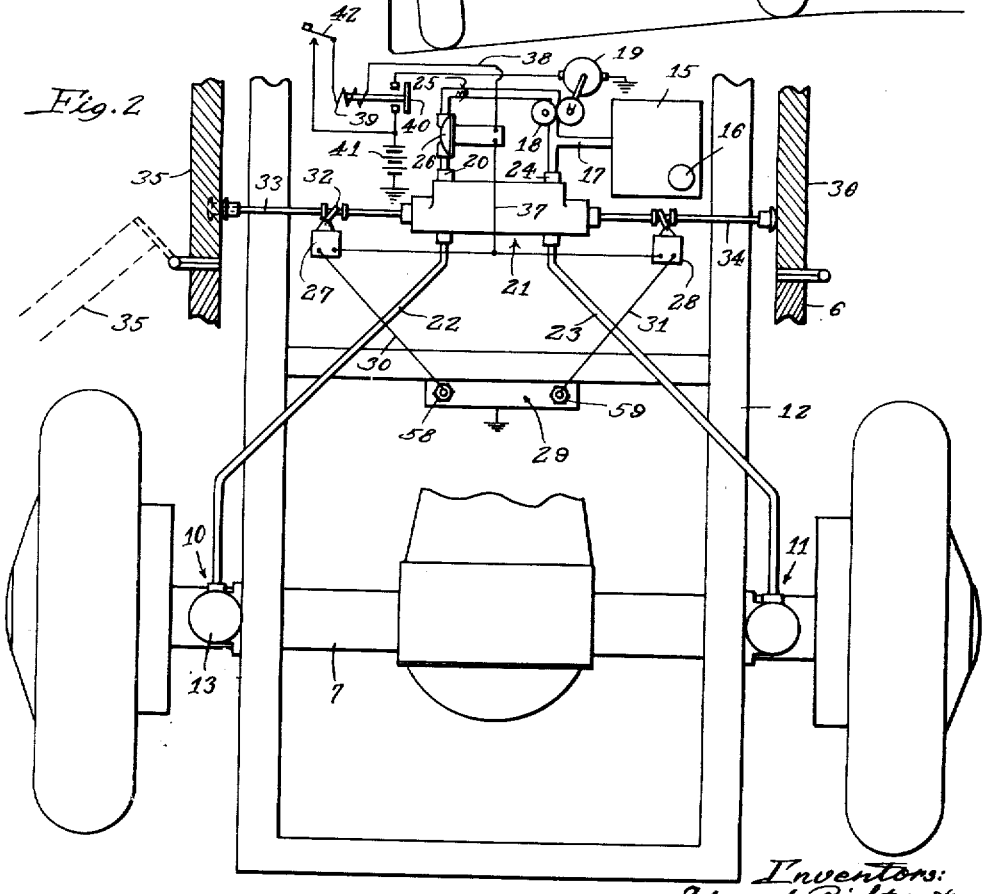
Fig. 2 is a plan view of the hearse chassis illustrating in a schematic fashion the automatic leveling means of our invention.

Referring to Fig. 2, the frame or "mound" on which the table 8 is mounted is indicated at 12 and has the cylinders 13 of the jacks 10 and 11 suitably secured to the sides thereof directly over the rear axle housing 7 so that the plungers 14 working therein and extensible therefrom will engage the rear axle housing to lift the frame and body relative to the axle, as illustrated in Figure 1. The jacks 10 and 11 are operable by any suitable fluid, although we prefer the use of oil. A reservoir for the oil is shown at 15 and has a removable filler cap 16. The pipe 17 is for removal of the oil from the tank and also for return thereof. A gear pump indicated at 18 is driven by an electric motor 19 to deliver oil under pressure to the inlet 20 of the control valve, indicated generally by the numeral 21. Two pipes 22 and 23 lead from the valve 21 to the two jacks 10 and 11 for the purpose of delivering oil under pressure selectively to either of the jacks in the manner presently described, or to return the oil from either of the jacks to the valve 21 for return to the tank 15 through the outlet 24 and pipe 17. A spring-pressed check valve 25 seats in the direction indicated so as to maintain pressure on the left side of the valve when the pump 18 has ceased operating, whereby, as will soon appear, to permit holding the plunger 14 of either jack extended with the load thereon. 26 is a pressure switch which is at all times subject to the pressure in the line and is arranged to break the circuit for the motor 19 in case it continues to operate after the jack plunger has been extended as far as it will go, whereby to prevent overload on the motor and undue pressure in the line. Now, the motor 19 is thrown into operation by the closing of either one of two switches 27 or 28, assuming that the level 29 is inclined sufficiently to close a circuit grounding the conductors 30 and 31, as will presently appear. The switches 27 and 28 are of a toggle type having levers 32 projecting therefrom and arranged to be moved from the positions shown by the outward movement of the rods 33 and 34 in the opening of the side doors 35 and 36, respectively. The two switches have a common conductor 37 extending therefrom and connected to one terminal of the switch 26. Another conductor 38 extends from the other terminal of the switch to the coil 39 of a relay 40. The latter is arranged upon completion of a circuit through the coil 39 to close the circuit through the motor 19 from the battery 41, which may be the battery used also for lighting and starting, or may be a separate battery for the purpose of supplying power for the operation of the leveling means. We prefer to provide a switch 42 on the instrument board to be closed by the driver when the hearse draws up to the curb for loading or unloading, in order that the automatic leveling means will not be operated except when desired.

In operation, assuming that the left side door 35 is opened, as indicated in dotted lines, the rod 33 moves outwardly under the action of a spring in the valve 21 to close the switch 27 and simultaneously connect the inlet 20 of the valve 21 with the pipe 22. Then, assuming that the driver previously closed the switch 42 and that the level 29 is inclined sufficiently to ground the conductor 30, it will be seen that the motor 19 will be thrown into operation by reason of the closing of the relay 40 through the following circuit: From the battery 41 through switch 42, coil 39, conductors 38 and 37, to switch 27, and through conductor 30 to the ground. The pump 18 is accordingly operated to draw oil from the tank 15 through pipe 17 and delivers the oil under pressure through check valve 25 and the diaphragm housing of the pressure switch 26 to the inlet 20 of the valve 21 and thence through pipe 22 to the cylinder 13 of the jacket 10. The motor 19 continues to operate the pump 18 until the jack 10 has leveled the frame 12 and body 6, at which time the motor stops because the relay 40 opens as a result of the opening of the circuit at the level 29, when the latter assumes a horizontal position with the frame 12. The jack 10 holds its position because the check valve 25 seats and prevents return flow of oil through the pump 18 to the tank 15. However, when the door 35 is closed, the rod 33 moves a valve plunger in the valve 21 against the action of its spring, as will soon appear, and establishes communication between the pipe 22 and the outlet 24 of the valve 21, thereby allowing the oil to be returned from the jack 10 to the tank 15, so that the hearse body returns to its normal position with relation to the rear axle housing. The fact that the hearse cannot resume its normal side-tilt until the door has been closed avoids any danger of damage to the door by contact with the curb or sidewalk. The operation is the same when the hearse is disposed with the other side next to the curb and the door 36 is opened, the jack 11 in that case being operated to level the body.

Figure 3:
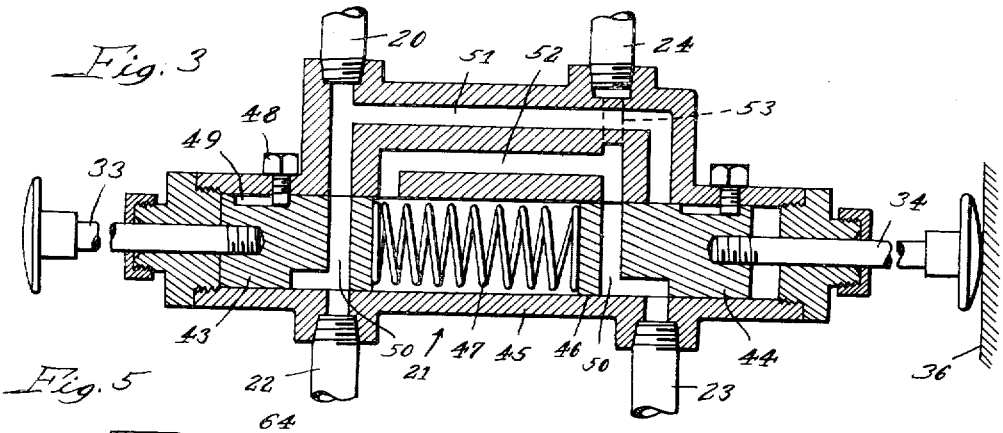
Fig. 3 is a horizontal section through the control valve incorporated in the oil circuit.

In Fig. 3 the valve 21 is shown with the parts thereof in a position assuming that the door 35 is opened and the door 36 closed, which corresponds to the condition above outlined. The valve plunger 43 on the end of the rod 33 is in a position establishing communication between the oil inlet 20 and the pipe 22 leading to the jack 10, and the valve plunger 44 on the end of the rod 34 is in a position establishing communication between the pipe 23 extending from the jack 11 and the oil outlet 24. The two valve plungers are slidably received in the body 45 of the valve 21 and are normally urged to the outermost ends of the bore 46 under the action of a coiled compression spring 47 disposed between the plungers. Screws 48 cooperate with grooves 49 in the plungers to hold the same against rotation, whereby to keep the passages 50 in said plungers in the same plane with passages 51 and 52 provided in the valve body, in order that communication will be established with the one or the other passage, according to the position of the respective plungers. The passage 51 is for establishing communication with the inlet 20 for either of the passages 50, when the plunger is at the outer end of the bore, like plunger 43. A passage 53 establishes communication between the outlet 24 and the passage 52, and the latter establishes communication with the outlet for either of the plungers when the same is moved in against the action of the spring 47 to a position like the plunger 44. It will be seen that the passage 52 prevents dash-pot action in the bore 46 between the two plungers by allowing the admission of fluid to this space or the escape of fluid therefrom in the back and forth movement of the plungers. It should be clear that when the door 35 or 36 is opened, the plunger associated with that door moves outwardly under the action of the spring 47 to a position like the plunger 43 so that oil under pressure will be delivered from the inlet 20 to the jack controlled by the plunger in question, and further, that when the door is closed, the same plunger is moved inwardly to a position like the plunger 44 so as to permit return of the oil from the jack through the outlet 24 to the tank 15.

The level 29 comprises a hollow elongated metallic body 54 suitably secured to the frame 12 in a plane parallel to the plane of said frame. The chamber 55 in the body 54 has the floor 56 thereof sloped from both ends toward the middle so that the mercury pool or button 57 provided therein will gravitate toward the central position shown when the level is truly horizontal. Terminal plugs 58 and 59 are provided on the opposite ends of the level and have insulated terminals 60 and 61, respectively, connected with the conductors 30 and 31 mentioned above. In that way, since it is clear that the body 54 of the level is grounded by being fastened to the frame, either of the conductors is grounded by having the mercury pool come in contact with the terminal associated therewith. Thus, if the level is tilted to the left, the pool occupies a position at the left end of the floor 56, in contact with the terminal 60, thereby grounding the conductor 30 connected with the plug 58, and if the inclination is to the right, the conductor 31 is similarly grounded.

Figure 5:
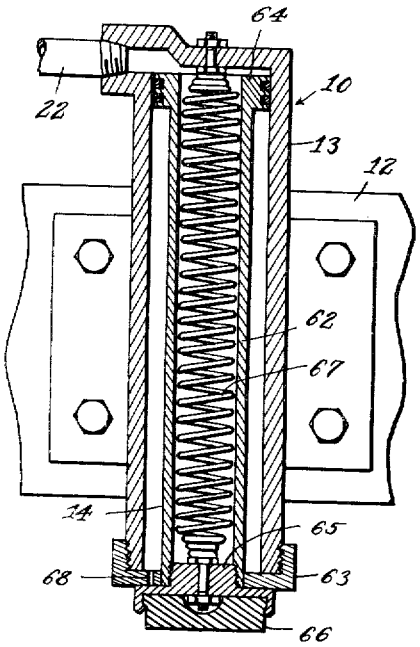
Fig. 5 is a vertical section through one of the jacks for lifting the hearse body relative to the rear axle housing.
Figure 4:
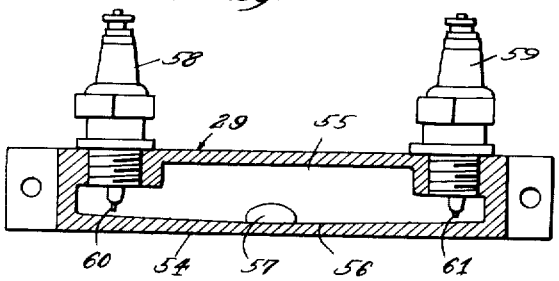
Fig. 4 is a vertical longitudinal section through the level incorporated in the electrical circuit.

Any suitable or preferred form of hydraulic jack may be used in connection with the present invention. The one shown in Fig. 5 has the plunger 14 formed with a reduced tubular portion 62 guided in a gland nut 63 on the lower end of the cylinder 13, the upper end of the plunger being enlarged as shown at 64 and having a close working fit in the cylinder bore. A plug 65 closes the lower end of the plunger 14 and serves both as a mounting for a bumper block 66 of any suitable sound-deadening material, for engagement with the rear axle housing, and as a place for anchoring the lower end of a coiled tension spring 67 disposed inside the plunger, the upper end of the spring being attached to the upper end of the cylinder 13 as shown. When oil under pressure is admitted to the cylinder, the plunger is moved downwardly against the action of the spring 67, the air in front of the enlarged portion 64 being allowed to escape through a small vent 68 provided in the nut 63. Then, when the pipe 22 is thrown into communication with the outlet 24 of the valve 21, as above described, the spring 67 is allowed to return the plunger to the retracted position as the oil is returned to the tank 15.

It is believed the foregoing description conveys a good understanding of our invention. The appended claims have been drawn with a view to covering all legitimate modifications and adaptations.

We claim:

1. In a hearse, having opposite side doors, and a casket table extensible from either side of the hearse through a selected door opening when the door therefor is opened, power operated means adapted to be placed in operable condition by the opening of a door for leveling said hearse from a position of sidewise inclination in either direction from a normal intermediate horizontal position whereby automatically to bring the longitudinal axis of the extended table to substantially horizontal position.

2. In a hearse, having a side service door, and a casket table extensible from the side of the hearse when the door is opened, power operated means for leveling the hearse sidewise, whereby to bring the longitudinal axis of the extended table to substantially horizontal position, and mechanism interposed between the door and power operated means operable by the door in opening to automatically control the starting of said leveling means, whereby to safeguard said table from damage due to sidewise inclination of the hearse.

3. In a hearse having a side service door, and a casket table extensible from the side of the hearse when the door is opened, a power operated leveling means for leveling the hearse sidewise so as to bring the longitudinal axis of the extended table to substantially horizontal position, mechanism interposed between the door and leveling means operable by the door in opening to automatically start the leveling means, whereby to safeguard the table from damage due to sidewise inclination of the hearse, and a level on the hearse for automatically causing stoppage of the leveling means when the hearse is leveled.

4. In a hearse having a pair of opposed side service doors, and a casket table extensible from either side of the hearse through a selected door opening when the door therefor is opened, power operated leveling means adapted to be placed in operable condition by the opening of the door to level the hearse from a position of sidewise inclination in either direction from a normal intermediate position whereby automatically to bring the longitudinal axis of the extended table to substantially horizontal position, and a level on the hearse for automatically causing stoppage of the leveling means when the hearse is leveled.

5. In a hearse having a pair of opposed side service doors swingable outwardly in opening, and a casket table extensible from either side of the hearse through a selected door opening when the door therefor is opened, fluid operated leveling jacks on opposite sides of the hearse, rendered operative by the opening of a service door for raising the hearse from either side depending on which door is opened whereby to level the hearse and bring the longitudinal axis of the extended table to substantially horizontal position, a source of pressure fluid supply, selector valve means shiftable automatically in the opening and closing of either door, said valve means adapted in the opening of a door to establish communication between the source and the associated one of said jacks, and a level on the hearse for automatically interrupting the jacking operation of either jack when the hearse is leveled.

6. The combination set forth in claim 5 including an electric motor for driving a pump constituting the source of pressure fluid supply, and electric switch means operated automatically when either of the doors is opened whereby to throw the motor into operation.

7. The combination set forth in claim 5 including an electric motor for driving a pump constituting the source of pressure fluid supply, and electric switch means operated automatically in the opening of either of the doors whereby to throw the motor into operation, said level being electrically connected with the motor to interrupt the circuit and stop the motor when the hearse is leveled.

8. The combination set forth in claim 5 including an electric motor for driving a pump constituting the source of pressure fluid supply, electric switch means operated automatically when either of the doors is opened whereby to throw the motor into operation, and means responsive to a predetermined fluid pressure in the jack being operated for automatically interrupting the circuit for the motor to stop the same when the movable part of the jack has reached a limit position.

9. The combination set forth in claim 5 including a check valve between the source of pressure fluid supply and the selector valve means for trapping fluid in the jack being operated, whereby to maintain the hearse in elevated position by means of the jack, said selector valve means being constructed to afford an exhausting passage for said jack in the position to which the same is automatically shifted when the door that was opened is closed.

10. In a hearse having a door hinged to swing outwardly in opening and a casket table extensible through the door opening when the door is opened, power operated means for leveling said hearse from a position of sidewise inclination whereby to bring the longitudinal axis of the extended table to substantially horizontal position, and mechanism interposed between the door and power operative means operable by the door in the closing thereof for controlling the return of the hearse to pre-leveled position.

11. In a hearse having a door hinged to swing outwardly in opening and a casket table extensible through the door opening when the door is opened, power operated means for leveling said hearse from a position of sidewise inclination whereby to bring the longitudinal axis of the extended table to substantially horizontal position, and mechanism interposed between the door and power operated means operable by the door in the opening and closing thereof for controlling the operation of the leveling means so that the hearse is leveled upon opening of the door and returns to pre-leveled position upon closing of the door.

12. In a hearse having a door and a casket table extensible through the door opening, electrically operated hydraulic means for leveling said hearse from a position of sidewise inclination whereby to bring the longitudinal axis of the extended table to substantially horizontal position, a switch for connecting said leveling means with a source of electric current supply arranged to be closed automatically in the opening of the door, and a valve arranged to be opened automatically upon closing of the door, whereby to permit flow of fluid from said leveling means so as to allow return of the hearse to pre-leveled position.

13. In a hearse having a door and a casket table extensible through the door opening, electrically operated hydraulic means for leveling said hearse from a position of sidewise inclination whereby to bring the longitudinal axis of the extended table to substantially horizontal position, a switch for connecting said leveling means with a source of electric current supply arranged to be closed automatically in the opening of the door, a level for thereafter automatically breaking the circuit when the hearse is leveled, and a valve arranged to be opened automatically upon closing of the door, whereby to permit flow of fluid from said leveling means so as to allow return of the hearse to pre-leveled position.

14. In a vehicle comprising a body resiliently supported on an axle, the body having an outwardly opening side door, power operated means for elevating one side of the body relative to the axle whereby substantially to level the vehicle body about its longitudinal axis from a position of sidewise inclination, and mechanism interposed between the door and power operated means operated by the door in the closing thereof for preventing return of the vehicle body to normal relation to the axle prior to the closing of the door.

15. In a vehicle comprising a body resiliently supported on an axle, the body having an outwardly opening side door, power operated means for elevating one side of the body relative to the axle whereby substantially to level the vehicle body about its longitudinal axis from a position of sidewise inclination, and mechanism interposed between the door and power operated means operable by the door in the opening and closing thereof for controlling the operation of the leveling means so that the vehicle body is arranged to be leveled upon opening the door and returns to pre-leveled position upon closing the door.

16. In a vehicle comprising a body resiliently supported on an axle, the body having an outwardly opening side door, power operated means for elevating one side of the body relative to the axle whereby substantially to level the vehicle body about its longitudinal axis from a position of sidewise inclination, said power operated means being electrically operated, and a switch operable by the door automatically in opening for controlling connection of said leveling means with a source of electric current supply.

17. In a vehicle comprising a body resiliently supported on an axle, the body having an outwardly opening side door, power operated means for elevating one side of the body relative to the axle whereby substantially to level the vehicle body about its longitudinal axis from a position of sidewise inclination, said power operated means being of a fluid operable type, and a fluid control valve operable by said door automatically in closing to allow return of the vehicle to pre-leveled position.

18. In a vehicle comprising a body resiliently supported on an axle, the body having an outwardly opening side door, electrically operated hydraulic means for elevating one side of the body relative to the axle whereby substantially to level the vehicle body about its longitudinal axis from a position of sidewise inclination, a switch operable by the door in opening for connecting said leveling means with a source of electric current supply, and a valve arranged to be operated in the closing of the door whereby to permit return flow of fluid from said leveling means so as to allow return of the vehicle body to pre-leveled position.

19. In a vehicle comprising a body resiliently supported on an axle, the body having an outwardly opening side door, electrically operated hydraulic means for elevating one side of the body relative to the axle whereby substantially to level the vehicle body about its longitudinal axis from a position of sidewise inclination, a switch operable by the door in opening for connecting said leveling means with a source of electric current supply, a level arranged to break the electric circuit of said leveling means when the vehicle body is leveled, and a valve arranged to be operated in the closing of the door whereby to permit return flow of fluid from said leveling means so as to allow return of the vehicle body to pre-leveled position.

20. In a vehicle comprising a supporting axle and a body supported on springs thereon and having doors on the opposite sides thereof swingable outwardly in opening, fluid operable leveling jacks on opposite sides of the vehicle between the body and axle for raising the body from either side to a level position from a position of sidewise inclination, means for delivering fluid under pressure to said jacks, and valve means arranged to be operated by the doors in the closing thereof for controlling flow of fluid from said jacks whereby to prevent return of the vehicle body to pre-leveled position prior to the door's closing.

21. In a vehicle comprising a supporting axle and a body supported on springs thereon and having doors on the opposite sides thereof swingable outwardly in opening, fluid operable leveling jacks on opposite sides of the vehicle between the body and axle for raising the body from either side to a level position from a position of sidewise inclination, electrically operated means for delivering fluid under pressure to said jacks, and electrical switch means controlling the operation of the last named means and arranged to be operated by said doors in opening.

22. In a vehicle comprising a supporting axle and a body supported on springs thereon and having doors on the opposite sides thereof, fluid operable leveling jacks on opposite sides of the vehicle between the body and axle for raising the body from either side to a level position from a position of sidewise inclination, electrically operated means for delivering fluid under pressure to said jacks, electrical switch means operable by the doors in opening for connecting said last named means with a source of electric current supply, and valve means arranged to be operated by the door in closing, whereby to permit return flow of fluid from said jacks so as to allow return of the vehicle body to pre-leveled position.

23. In a vehicle comprising a supporting axle and a body supported on springs thereon and having doors on the opposite sides thereof, fluid operable leveling jacks on opposite sides of the vehicle between the body and axle for raising the body from either side to a level position from a position of sidewise inclination, electrically operated means for delivering fluid under pressure to said jacks, electrical switch means operable by the doors in opening for connecting said last named means with a source of electric current supply, a level for automatically breaking the electrical circuit for said electrically operated means when the body is leveled, and valve means arranged to be operated by the door in closing, whereby to permit return flow of fluid from said jacks so as to allow return of the vehicle body to pre-leveled position.

24. In a vehicle comprising a supporting axle and a body supported on springs thereon, power operated leveling jacks on opposite sides of the vehicle for raising the body from either side relative to the axle to level the same from a position of sidewise inclination while standing at a curb, said leveling jacks being so related to the supporting axle and springs whereby when the jacks are in inoperative position insofar as leveling operation is concerned the body is supported solely by the springs on the axle, electrical means for operating said jacks, a manually operable switch in said body for controlling connection of said electrical means with a source of electric current supply, and a level on said body in the electrical circuit and arranged to break the circuit automatically independently of said manual switch when the vehicle body has been leveled.

25. In a vehicle comprising a supporting axle and a body supported on springs thereon and having a door swingable outwardly in opening, power operated leveling jacks on opposite sides of the vehicle for raising the body from either side relative to the axle to level the same from a position of sidewise inclination, electrical means for operating said jacks, a manually operable switch in said body for controlling connection of said electrical means with a source of electric current supply, and a control switch for said electrical means arranged to be operated by said door in opening whereby to open and close the electrical circuit independently of said manual switch.

26. In a vehicle comprising a supporting axle and a body supported on springs thereon and having a door swingable outwardly in opening, power operated leveling jacks on opposite sides of the vehicle for raising the body from either side relative to the axle to level the same from a position of sidewise inclination, electrical means for operating said jacks, a manually operable switch in said body for controlling connection of said electrical means with a source of electric current supply, a control switch for said electrical means arranged to be operated by said door in opening whereby to open and close the electrical circuit independently of said manual switch, and a level on said body in circuit with the aforesaid manual switch and door switch for automatically breaking the electrical circuit independently of said switches when the vehicle body is leveled.

27. In a vehicle comprising a supporting axle and a body supported on springs thereon, fluid operated leveling jacks on opposite sides of the vehicle for raising the body from either side relative to the axle to level the same from a position of sidewise inclination while standing at a curb, said jacks being so related to the vehicle axle and springs whereby the body is supported solely by the springs on the axle when the vehicle is in motion, electrical means for supplying fluid under pressure to said jacks, a manually operable switch in said body for controlling connection of said electrical means with a source of electrical current supply, and valve means in the fluid circuit operable by the door in closing to permit drainage of fluid from said jacks whereby to permit return of the vehicle body to pre-leveled position.

28. In a vehicle comprising a supporting axle and a body supported on springs thereon, fluid operated leveling jacks on opposite sides of the vehicle for raising the body from either side relative to the axle to level the same from a position of sidewise inclination while standing at a curb, said jacks being so related to the vehicle axle and springs whereby the body is supported solely by the springs on the axle when the vehicle is in motion, electrical means for supplying fluid under pressure to said jacks, a manually operable switch in said body for controlling connection of said electrical means with a source of electrical current supply, a level on said body in the electrical circuit arranged to break said circuit independently of said manual switch when the vehicle body is leveled, and valve means in the fluid circuit operable by the door in closing to permit drainage of fluid from said jacks whereby to permit return of the vehicle body to pre-leveled position.

29. In a hearse having a spring supported body provided with opposed side service doors hinged to swing outwardly in opening, and a casket table extensible from either side of the hearse body through either door opening, power operable leveling means for raising either side of the hearse body relative to the axle therebeneath to level the body from a position of sidewise inclination and bring the longitudinal axis of the extended table to a substantially horizontal position, and means controlling said leveling means and automatically operable by the door on the elevated side of the hearse in closing permitting return of the hearse to pre-leveled position.

30. In a hearse having a door hinged to swing outwardly in opening and a casket table extensible through the door opening when the door is opened, power operated hydraulic means for leveling said hearse from a position of sidewise inclination whereby to bring the longitudinal axis of the extended table to substantially horizontal position, and a valve operable to open position by the door in closing controlling return flow of fluid from said leveling means to allow return of the hearse to pre-leveled position.

31. In a hearse having a door hinged to swing outwardly in opening and a casket table extensible through the door opening when the door is opened, power operated hydraulic means for leveling said hearse from a position of sidewise inclination whereby to bring the longitudinal axis of the extended table to substantially horizontal position, a level for stopping the operation of the power operated hydraulic means automatically when the hearse is leveled, and a valve operable to open position by the door in closing, controlling return flow of fluid from said leveling means to allow return of the hearse to pre-leveled position.

32. In a vehicle comprising a body resiliently supported on an axle, the body having an outwardly opening side door, power operated hydraulic means for elevating one side of the body relative to the axle whereby substantially to level the vehicle body from a position of sidewise inclination, and a valve operable to open position by the door in closing, controlling return flow of fluid from said leveling means to allow return of the vehicle to pre-leveled position.

33. In a vehicle comprising a body resiliently supported on an axle, the body having an outwardly opening side door, power operated hydraulic means for elevating one side of the body relative to the axle whereby substantially to level the vehicle body from a position of sidewise inclination, a level for stopping the operation of the power operated hydraulic means automatically when the vehicle is leveled, and a valve operable to open position by the door in closing, controlling return flow of fluid from said leveling means to allow return of the vehicle to pre-leveled position.

34. In a vehicle comprising a supporting axle and a body supported on springs thereon and having doors on opposite sides thereof, power operated fluid type leveling jacks on opposite sides of the vehicle between the body and axle to raise the body from either side to a level position from a position of sidewise inclination, and valve means operable to open position by a door in closing, controlling return flow of fluid from said jacks so as to allow return of the vehicle body to pre-leveled position.

35. In a vehicle comprising a supporting axle and a body supported on springs thereon and having doors on opposite sides thereof, power operated fluid type leveling jacks on opposite sides of the vehicle between the body and axle to raise the body from either side to a level position from a position of sidewise inclination, a level for automatically stopping the operation of said power operated jacks when the vehicle body is leveled, and valve means operable to open position by a door in closing, controlling return flow of fluid from said jacks so as to allow return of the vehicle body to pre-leveled position.

EDWARD RICHTER.
AUGUST RICHTER.

CERTIFICATE OF CORRECTION.

Reissue No. 20,710. April 26, 1938.

EDWARD RICHTER, ET AL.

It is hereby certified that error appears in the printed specification of the above numbered patent requiring correction as follows: Page 3, second column, line 55, claim 10, for the word "operative" read operated; page 5, second column, line 67-68, claim 32, for "outwarly" read outwardly; and that the said Letters Patent should be read with this correction therein that the same may conform to the record of the case in the Patent Office.

Signed and sealed this 9th day of August, A. D. 1938.

Leslie Frazer (Seal) Acting Commissioner of Patents.